July 9, 1940.  D. W. FENTRESS ET AL  2,207,146
DIAPHRAGM
Filed March 23, 1938
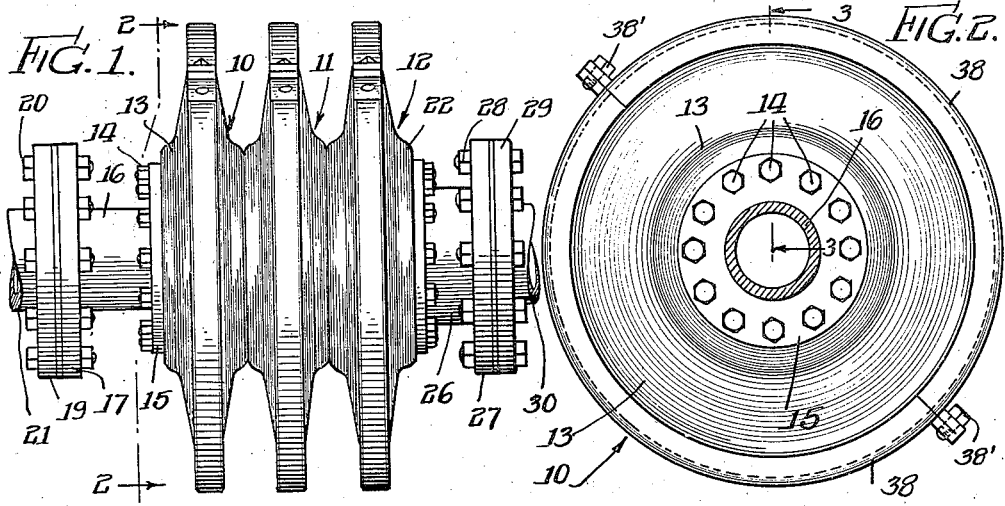
INVENTORS
Albert Dreyer
David Wendell Fentress
By: Cox & Moore ATTORNEYS Patented July 9, 1940

2,207,146

UNITED STATES PATENT OFFICE 2,207,146

DIAPHRAGM

David Wendell Fentress, Hubbard Woods, Ill., and Albert Dreyer, Lucerne, Switzerland, assignors to Chicago Metal Hose Corporation, Maywood, Ill., a corporation of Illinois Application March 23, 1938, Serial No. 197,742
In Switzerland April 2, 1937

7 Claims. (Cl. 285—90)

This invention relates to diaphragm or bellows constructions, and to the method of making the same.

It is a primary object of the invention to provide a diaphragm or bellows construction of maximum strength and durability, and yet of great flexibility and capable of a relatively long range of movement on expansion and contraction.

It is further object of the invention to provide a diaphragm construction which may be made of any suitable size, including the larger sizes, and which may be readily and cheaply constructed.

More specifically it is an object of the invention to provide a diaphragm composed of a plurality of superposed plates connected peripherally wherein the bending occurs in the plates themselves rather than in the connections between the plates, whereby to increase the durability and life of the diaphragm.

A still further object of the invention is to provide a diaphragm construction which is fluid-tight, which provides a maximum range of expansion and contraction per unit of length, and which exhibits no tendency to sag or bend away from the diaphragm axis in use.

Other objects and advantages of the invention will be apparent from the following description when taken in connection with the accompanying drawing.

In accordance with the invention, each of the walls of the diaphragm chambers is constructed of a plurality of superposed plates. Certain of the plates of each of the walls are permanently secured together peripherally, as by welding or the like, and the remaining plates of each wall, while held in position, are free to slide relative to the secured plates. By this means the number of plates may be increased as may be desired to give any required strength or fluid pressure resistance, and at the same time maximum flexibility in the wall structure is retained. The diaphragm may be made of any desired internal diameter and of sufficient wall thickness to satisfy the requirements of the installation. Due to its great flexibility a shorter length diaphragm may be used to supply the necessary extensibility in the structure for contraction or expansion thereof. The construction will exhibit no tendency to sag or bend from the axis of the diaphragm in use.

Referring to the drawing, wherein certain preferred embodiments of the invention are illustrated and wherein like reference numerals refer to like parts throughout:

Fig. 1 is a side view of one preferred form of diaphragm structure constructed in accordance with the invention, and specifically embodied in an axial compensator for a pipe line.

Fig. 2 is a sectional end view of the construction shown in Fig. 1 taken along the line 2—2 thereof.

Fig. 3 is a partial longitudinal sectional view of the Fig. 1 construction taken along line 3—3 of Fig. 2.

Fig. 4 is a partial detail view showing the manner of peripherally securing the plates at their outer edges in that form of construction illustrated in Figs. 1, 2 and 3.

Fig. 5 is a view similar to Fig. 3 but showing a modified arrangement for securing the plates peripherally at their inner edges, and also showing the diaphragm in collapsed or contracted position.

Fig. 6 is a partial detail view illustrating the connecting means for the inner edges of the plates of the form of construction shown in Fig. 5.

Fig. 7 is a partial detail view illustrating a modified arrangement for securing the outer peripheral edges of the plates together, and Fig. 8 is a partial detail view illustrating the modified form of construction for securing the inner peripheral edges of the plates.

Referring first to Figs. 1, 2 and 3 of the drawing, it will be seen that the construction shown for purposes of illustration comprises a series of diaphragm chambers 10, 11 and 12 arranged in axial alinement to form an expansible diaphragm or bellows structure. The end wall 13 of the diaphragm chamber 10 in the specific embodiment of use illustrated is rigidly secured by means of bolts 14 to a flange 15 formed as a part of a tube 16. A ring member 17 forms an anchorage for the bolts 14 and tightly compresses the wall 13 against the flange 15. Tube 16 also has a flange 18 which may be secured by bolts 20 to a similarly formed flange 19 on one pipe 21 of the pipe line with which the diaphragm or bellows is associated as illustrated, and for which it forms an axial expansion compensator. The end wall 22 of the diaphragm chamber 12 is similarly secured by bolts 23 and a ring 24 to a flange 25 formed on tube 26. The tube 26 also carries a flange 27 which may be secured by bolts 28 to a cooperating flange 29 on the other pipe 30 of the pipe line. Tube 16 is arranged within tube 26, the tubes being thus adapted for axial sliding or telescoping movement upon expansion or contraction of the diaphragm chambers. The movement of the tubes relative to each other upon expansion of the diaphragm, as shown in Fig. 3, is limited by a pair of collars 31 and 32 secured to tubes 16 and 26 respectively. The relative positioning of the tubes and collars when the diaphragm chambers are in collapsed or contracted position is illustrated in Fig. 5. The sliding connection between the tubes 16 and 26 is such that dirt or foreign matter is precluded from passing from the tubes into the bellows. The fluid pressure within the tubes which are in communication with the pipe line and form a part thereof will be transmitted to the diaphragm chambers, but such fluid pressure is prevented from leaking from the diaphragm chambers due to the fact that the chambers are all fluid-tight, as will hereinafter be pointed out. It will be seen that the arrangement provides a compensator for absorbing axial movement between pipes 21 and 30 toward or away from each other, while maintaining a fluid-tight connection between the pipes.

In accordance with the principles of the invention, each wall of the diaphragm chambers is composed of a plurality of plates. In the embodiment shown there are three plates 35, 36 and 37 forming each wall. The interior plate 35, which is in contact with the fluid within the diaphragm chambers, may be of selected material which is non-corrosive and resistant to the fluid being transmitted within the pipe line. The remaining plates 36 and 37 do not have any substantial surfaces thereof exposed to the fluid and accordingly may be made of more cheap metal. It is to be understood that all of the plates may be made of the same metal if desired, but by virtue of the laminated wall construction of the present invention, it is possible to make the interior plate of corrosion resisting metal or the like without increasing the cost of the entire wall structure, as would be necessary if the wall were made of a single metal plate.

The means for securing the plates at their outer peripheral edges comprises a channel ring 38 which may be formed in two semi-circular parts secured together by bolts 38' as shown in Fig. 2. The channel ring is of such size that its side walls tightly embrace the plates and hold them together, but the plates may slide relative to each other within the channel upon expansion and contraction of the diaphragm chambers, a space 39 being provided within the channel beyond the plate peripheries. As best shown in Fig. 4, preferably only the interior plates 35 are welded as indicated at 40. The remaining plates 36 and 37 are not welded and are accordingly free for relative sliding movement as the diaphragm chambers are contracted and expanded. The weld 40 may be produced by any suitable welding method and is preferably a continuous weld peripherally of the plates whereby to provide a fluid-tight seal for the outer peripheral connection.

The inner peripheries of the plates are secured together by bolts 41 and rings 42, the arrangement being such that the plates are drawn into fluid-tight engagement by the rings upon the drawing up of the bolts. Preferably the plates are not welded together at their inner peripheral connection, although the exterior plates 37 may be so welded, if desired, to insure a fluid-tight connection. By reason of the laminated wall construction wherein each wall is constructed of a plurality of thin plates, and by reason of the fact that only certain of the plates in each wall are welded, the remaining plates of the wall being free for relative sliding movement, a very flexible yet strong wall structure is produced. While a wall structure composed of three superposed plates has been shown and described for purposes of illustration, it is to be understood that the number of plates may be increased or decreased as may be desired. Thus, the number of plates may be increased to increase the strength of the wall to meet the stresses and fluid pressure requirements of a given installation, but due to the laminated wall structure the flexibility of the wall is preserved, insuring that the diaphragm chambers may be readily and easily expanded and contracted. The laminated wall structure of the present invention may be much more easily flexed than would be possible with a single plate wall of like thickness. Accordingly the force required to expand or contract the chambers for any given size of diaphragm is reduced. Also, the stress set up in the thin laminated plates upon any given movement of the chamber wall is less than the stress which would be set up in a single plate wall. Accordingly the durability of the construction is increased. The channel ring 38 tightly grips the outer plate peripheries and accordingly protects the weld 40 from rupture during flexure of the diaphragm. Similarly the bolts 41 and the ring members 42 hold the inner peripheries of the plates in position during flexure of the diaphragm and protect any welds which may be provided at this inner plate connection. Also, it is further to be noted that the cross section of the plates is of general S-shape by reason of the bends in the plates as shown at 45 and 46. This shaping of the plates directs the flexure into the plates themselves rather than to the connections between the plates at their outer and inner peripheries. Experience has shown that superposed plate diaphragms tend to break down at the points of connection between the plates. The present construction protects these points of connection and accordingly increase the durability of the diaphragm in use.

In Figs. 5 and 6 there is provided a modified form of construction wherein the inner peripheries of the interior plates 35, which are in contact with the fluid within the diaphragm, are extended beyond the ends of plates 36 and 37 and welded together as indicated at 50. The weld 50 preferably extends completely around the periphery of the plates thereby forming a fluid-tight seal and protecting the ends of plates 36 and 37 from contact with the fluid within the diaphragm. The welds 50 are prevented from rupture during expansion and contraction of the diaphragm chambers by the bolts 41 and rings 42 which prevent the bending stresses from being transmitted to the welds. In this form of construction, as further indicated in Fig. 5, the interior plates for the end diaphragm walls may be extended inwardly and welded to the tube flanges 15 and 25 as indicated at 51 and 52 respectively. By this arrangement a welded fluid-tight seal is provided at each joint of connection which positively prevents the leakage of fluid from the diaphragm construction. The fluid is also prevented from contacting any surfaces of the diaphragm plates 36 and 37.

In Fig. 7 there is illustrated a modified form of construction for securing the plates together at their outer peripheral edges. In this form of construction the ring member 55 which encircles the outer peripheries of the plates is of L-shaped cross section rather than of channel cross section as in the embodiment of the invention previously described, and the plates are clamped tightly together by means of a cooperating ring member 56 urged toward the vertical flange of the L-shaped member by means of bolts 57. In this form of construction the members 55 and 56 may be of complete circular form and not of half circular form as in the case of the channel member 38. In this form of construction the bolts 57 pass loosely through openings 58 cut in the plates so as not to interfere with the positioning of the plates and their flexure during expansion and contraction of the diaphragm chambers.

In Fig. 8 a modified form of construction for the inner edges of the plates is illustrated. In this form of the invention thin gaskets 60, which may be of paper or the like, are interposed between the abutting diaphragm plates to insure the maintenance of a fluid-tight connection. In this construction the plates are not welded together.

When the device is used as an axial compensator, the plates may be of any size necessary to accommodate the diameter of the tubes 16 and 26 which may be required for the installation. Larger size tubes may be readily accommodated. In use the diaphragm structure does not tend to sag, nor will it bend away from its structural axis. Although a diaphragm of three chambers has been illustrated, it is obvious that a greater or smaller number of chambers may be provided, if desired. However, due to the flexibility of the diaphragm chambers, a shorter length diaphragm may be employed to give the same range of expansion and contraction as would require a longer and accordingly heavier and more costly diaphragm in a single thickness walled structure.

While the diaphragm or bellows has been described in connection with a compensator for pipe lines, it is to be understood that the diaphragm is of general utility and is well adapted for other uses, for example, due to its inherent flexibility and durability, it is well adapted for use as a piston pump, pressure regulator, or thermostat.

It is obvious that various changes may be made in the specific embodiments of the invention shown for purposes of illustration without departing from the spirit of the invention. Accordingly the invention is not to be limited to the specific structure shown and described, but only as indicated in the following claims.

The invention is hereby claimed as follows:

1. A diaphragm comprising a plurality of alined chambers, each of the diaphragm walls of each of said chambers being composed of a plurality of superposed flexible plates, one of the plates in one wall of one of said chambers being welded to one of the plates in the abutting wall of an adjacent chamber, the remaining plates of said walls being held in position but being free to slide relative to said welded plates.

2. A diaphragm comprising a plurality of alined chambers, each of the diaphragm walls of said chambers being composed of a plurality of superposed plates, the peripheries of the interior plates of the abutting walls of adjacent chambers being extended beyond the peripheries of the remaining plates of said walls into contacting relation and being welded together whereby to seal the peripheries of said remaining plates from access to the interior of said chambers.

3. A diaphragm comprising a plurality of alined chambers, each of the diaphragm walls of said chambers being composed of a plurality of superposed plates, one of the plates in the wall of one of the chambers being welded to one of the plates in the abutting wall of an adjacent chamber at one marginal connection of said plates, all of the plates in said walls at the oppositely disposed marginal connection being held in position but being free for relative sliding movement.

4. A diaphragm comprising a plurality of alined communicating chambers, each of the walls of said chambers being formed from a plurality of superposed plates peripherally secured together at their outer and inner peripheries, certain of the plates at one of said peripheral connections being welded together, and a clamp member embracing said plate peripheries at said last named connection for holding them together, the plates being relatively slidable upon each other.

5. A diaphragm comprising a plurality of alined chambers, each of the diaphragm walls of said chambers being formed of a plurality of superposed plates, one of the plates of the wall of one of said chambers being welded to one of the plates in the abutting wall of an adjacent chamber, and a clamp assembly embracing all of the plates of both of said walls to hold them together, certain of the plates being free to slide relative to each other.

6. A diaphragm comprising a plurality of alined chambers, each of the diaphragm walls of said chambers being formed of a plurality of superposed plates, the interior plates only of the walls of the diaphragm chambers being welded peripherally at their outer and inner peripheries and serving to seal the remaining wall plates from access to the interiors of said chambers.

7. A diaphragm comprising a plurality of alined chambers, each of the diaphragm walls of said chambers being composed of a plurality of superposed plates, and means for securing said plates together in sets along their inner and outer marginal peripheries, the plates of the individual diaphragm walls being free to slide relative to each other during flexure of the diaphragm.

DAVID WENDELL FENTRESS.
ALBERT DREYER.